Dec. 26, 1922.
O. JACOBSEN.
LUBRICATED VALVE COCK.
FILED MAR. 8, 1921.
1,440,083
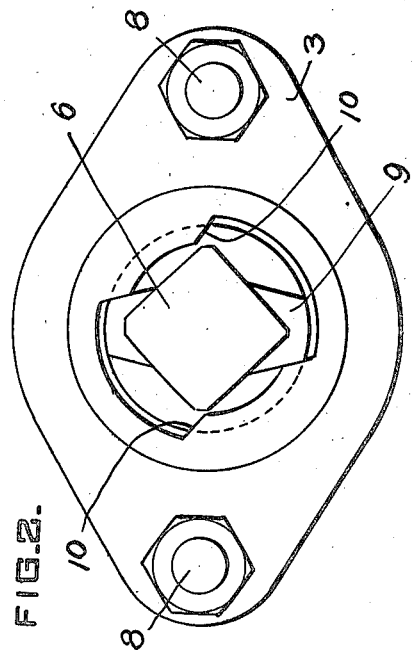
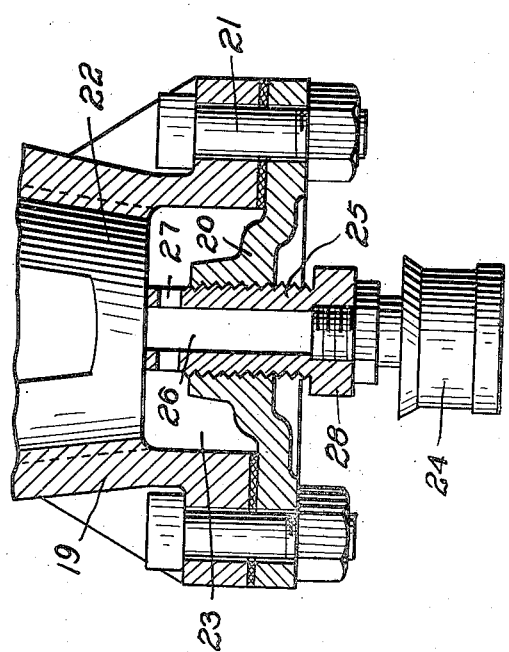
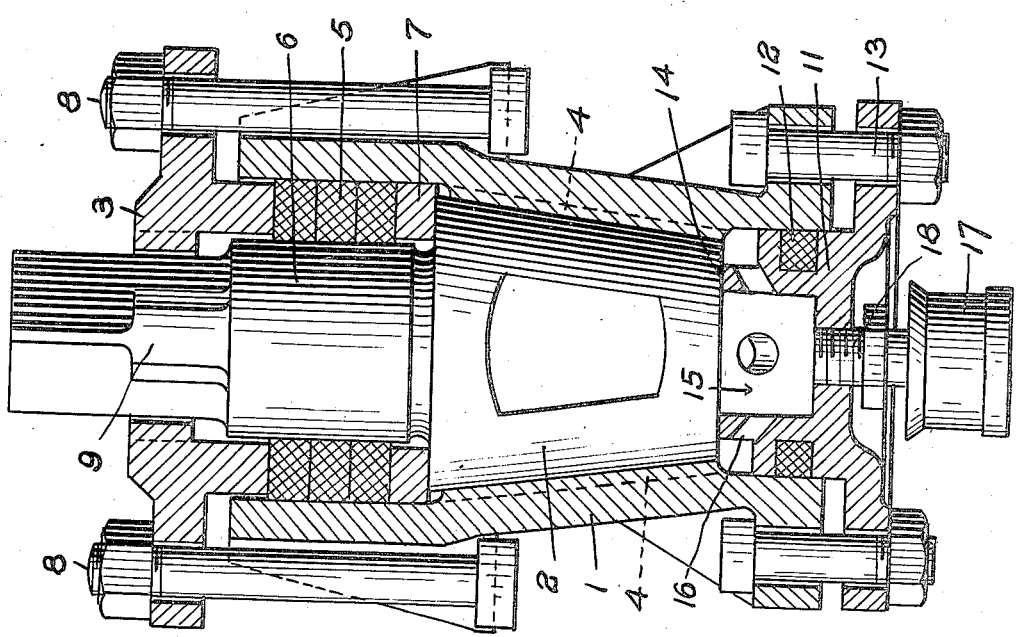
INVENTOR
Øystein Jacobsen
James C. Bradley
Atty.

Patented Dec. 26, 1922.

1,440,083

UNITED STATES PATENT OFFICE.

OYSTEIN JACOBSEN, OF DAYTON, OHIO, ASSIGNOR TO THE DURIRON COMPANY INC., A CORPORATION OF NEW YORK.

LUBRICATED VALVE COCK.

Application filed March 8, 1921. Serial No. 450,768.

*To all whom it may concern:*

Be it known that I, OYSTEIN JACOBSEN, a citizen of the United States, and a resident of Dayton, in the county of Montgomery and State of Ohio, have made a new and useful Invention in Lubricated Valve Cocks, of which the following is a specification.

The invention relates to lubricated cocks or valves. It has for its principal objects; the provision of a construction of the type specified, (1) having improved means for lubricating the valve; (2) having improved positive mechanical means for loosening the plug in case it should become stuck; (3) which is particularly serviceable in use with corrosive liquids, and in which the construction is such that those parts exposed to the liquid can be made without difficulty from acid resisting material, while those parts not exposed to the action of the liquid may be made of cheaper, more easily machined material; and (4) which is of cheap simple construction, not liable to leak or get out of order and in which the parts are readily reached for replacement or repair. Certain embodiments of the invention are illustrated in the accompanying drawings wherein;

Figure 1 is a vertical section through the cock. Fig. 2 is a plan view. And Fig. 3 is a vertical section through the lower portion of a modified construction.

Referring to the construction of Figs. 1 and 2, 1 is the casing of the plug cock or valve, 2 is the plug or valve, and 3 is a follower member or gland of a stuffing box, these three parts being preferably made of an acid resisting composition although this is not necessarily the case as the valve may be used in locations which do not require an acid resisting composition.

The plug is tapered as illustrated and lubricating grooves 4 are provided along the opposing surfaces of the plug and its seat in order to permit the lubrication of these surfaces and to permit a flow of lubricant from one end of the plug to the other. Suitable packing 5 is provided around the stem or shank 6 of the plug, such packing lying above the wear ring 7 which is also preferably made of an acid resisting composition. The follower or gland 3 is held in position by means of the bolts 8, and the rotation of the stem and the plug is limited by means of the stop lugs 9 carried by the stem and adapted to engage the stop shoulders 10 on the member 3.

In order to loosen the plug in case it becomes so tightly stuck as to prevent its rotation due to corrosion or other causes, the piston member 11 is provided located in the lower open end in the casing. This piston is provided with suitable packing 12 and when moved upwards by means of the bolts 13 its upper end 14 engages the end of the plug and moves the plug upward. The piston is preferably made hollow thus providing the chamber 15 which communicates with the space outside the piston by means of the passages 16. This chamber 15 constitutes a reservoir for lubricant, thus adding its capacity to that of the grease cup 17 mounted upon the piston and provided with the hollow stem 18 leading to the chamber 15 by means of which lubricant is supplied from the grease cup for lubricating the plug or valve. Any desired type of grease cup may be employed, the ordinary type having a rotating cap as illustrated, by means of which the grease or oil is fed upward.

The piston member which is protected by the lubricant from contact with the liquid passing through the plug, may be made from ordinary valve material such as cast iron or composition.

The lubricant is fed into the chamber 15 and thence through the openings 16 to the space beneath the plug and thence upward through the passages 4, such passages 4 discharging at their upper ends to the space beneath the wear ring 7. In this way the valve may be kept thoroughly lubricated and in case of sticking of the valve it may be readily loosened by operating the nuts on the bolts 13 so as to cause the flange 14 of the piston to engage the inner end of the plug and lift it sufficiently to loosen it.

Fig. 3 illustrates a modified construction in which the lower end 19 of the valve casing is provided with a closure member 20 held in place by means of the bolts 21. The plug 22 and the remainder of the mechanism lying above the parts shown are the same as in the constructions of Figs. 1 and 2. The space 23 lying below the plug constitutes a reservoir for lubricant corresponding to the chamber 15 in Figs. 1 and 2. This reservoir is supplied with oil from the grease cup 24 carried by the plug 25. The plug 25 is screw threaded into the member 20 and is provided with a central passage 26 and lateral passages 27 leading to the space 23. The lower end of the plug 25 is provided with an end 28 in the form of a nut so that a wrench may be applied thereto and the plug 25 screwed upward when it is desired to lift the valve in case of the sticking thereof due to corrosion or any other cause. The operation of the grease cup 24 feeds the lubricant into the chamber 23 and then upward between the valve or plug and its seat.

What I claim is:

1. In combination in a plug cock, a casing having a tapering seat and a chamber or recess below the seat, a tapering plug, a device supported by the casing in opposition to the inner end of the plug and adapted to raise the plug when moved inward, and means for feeding a lubricant through said device into said chamber or recess.

2. In combination in a plug cock, a casing having a tapering seat and a chamber or recess below the seat, a tapering plug, a screw operated lifting device supported upon the casing in opposition to the inner end of the plug and adapted to loosen the plug from its seat when moved inward, and means carried by said lifting device for feeding a lubricant into said chamber or recess.

3. In combination in a plug cock, a casing having a tapering seat and a chamber or recess below the seat, a tapering plug, a hollow screw operated lifting device supported from the casing in opposition to the inner end of the plug and adapted to engage and loosen the plug when moved inward, and a grease cup carried by said device and adapted to feed lubricant therethrough into said chamber or recess.

4. In combination in a plug cock, a casing open at both ends and having a plug seat, a plug having an operating shank at its outer end and terminating at its inner end at a point inside the casing, a metal piston mounted for reciprocation in the opening at the inner end of the casing in opposition to the inner end of the plug and closing said opening, and means for forcing the piston against the end of the plug to lift it.

5. In combination in a plug cock, a casing open at both ends provided with a plug seat and having a cylindrical portion at its inner end, a plug having an operating shank at its outer end, a metal piston mounted for movement in said cylindrical portion, packing means for the piston, and means for forcing the piston against the inner end of the plug.

6. In combination in a plug cock, a casing open at both ends and having a tapering seat, a tapering plug having an operating shank at its outer end, a gland and packing for said shank, a metal piston mounted for movement back and forth in the inner end of the casing in opposition to the end of the plug, and means forcing the piston against the inner end of the plug and adapted to lift such plug.

7. In combination in a plug cock, a casing open at both ends and having a plug seat, a plug having an operating shank at its outer end, a metal piston mounted for reciprocation in the inner end of the casing in opposition to the inner end of the plug, and screw means for forcing the piston against the inner end of the plug and adapted to lift such plug.

8. In combination in a plug cock, a casing open at both ends and having a plug seat, a plug having an operating shank at its outer end, a metal piston mounted for reciprocation in the inner end of the casing in opposition to the inner end of the plug and adapted to lift such plug, means for forcing lubricant into a space between the plug and piston, and means for forcing the piston toward the plug.

9. In combination in a plug cock, a casing open at both ends and having a plug seat, a plug having an operating shank at its outer end, a piston mounted for reciprocation in the inner end of the casing in opposition to the inner end of the plug, means for forcing lubricant through the piston, and means for forcing the piston toward the plug.

10. In combination in a plug cock, a casing open at both ends and having a plug seat, a plug having an operating shank at its outer end, a piston mounted for reciprocation in the inner end of the casing in opposition to the inner end of the plug, lubricating means carried by the piston for supplying lubricant past the piston, and screw means for forcing the piston inward.

11. In combination in a plug cock, a casing open at both ends and having a plug seat, a plug having an operating shank at its outer end, a piston mounted for reciprocation in the inner end of the casing in opposition to the inner end of the plug, a grease cup carried by the piston for forcing lubricant therethrough, and means for forcing the piston inward to engage the plug and lift it, in case it becomes stuck.

12. In combination in a plug cock, a casing open at both ends and having a tapering seat and a cylindrical portion at its inner end, a tapering plug in the casing having an operating shank at its outer end, a lubricating passage leading along the opposing surfaces of the plug and seat, a gland and packing for said plug shank, a piston mounted for movement back and forth in said cylindrical portion of the casing and adapted to loosen the plug in case of sticking, screw means for moving the piston, and means for forcing lubricant into the space between the piston and plug and thence through said passage.

13. In combination in a plug cock, a casing open at both ends and having a tapering seat and a cylindrical portion at its inner end, a tapering plug in the casing having an operating shank at its outer end, a lubricating passage leading along the opposing surfaces of the plug and seat, a gland and packing for said plug shank, a piston mounted for movement back and forth in said cylindrical portion of the casing and adapted to loosen the plug in case of sticking, screw means for moving the piston, and means carried by the piston for forcing lubricant therethrough and thence through said passage.

14. In combination in a plug cock, a casing open at both ends and having a tapering seat and a cylindrical portion at its inner end, a tapering plug in the casing having an operating shank at its outer end, a lubricating passage leading along the opposing surfaces of the plug and seat, a gland and packing for said plug shank, a piston mounted for movement back and forth in said cylindrical portion of the casing and adapted to loosen the plug in case of sticking, screw means for moving the piston and a grease cup carried by the piston for forcing lubricant therethrough and thence through said passage.

15. In combination in a plug cock, a casing open at both ends and having a tapering seat and a cylindrical portion at its inner end, a tapering plug in the casing having an operating shank at its outer ends, a lubricating passage leading along the opposing surfaces of the plug and seat, a gland and packing for said plug shank, a hollow piston having a lateral outlet passage through its wall and mounted for movement back and forth in said cylindrical portion of the casing, screw means for moving the piston inward to engage the plug and loosen it in case of sticking, and means carried by the piston for forcing lubricant to the interior thereof and thence through said lateral passage and through said first mentioned passage.

In testimony whereof, I have hereunto subscribed my name this 4 day of March, 1921.

O. JACOBSEN.

Witnesses:
W. E. PRATT,
M. W. SMITH.